(12) United States Patent
Wu et al.

(10) Patent No.: US 8,756,246 B2
(45) Date of Patent: Jun. 17, 2014

(54) METHOD AND SYSTEM FOR CACHING LEXICAL MAPPINGS FOR RDF DATA

(75) Inventors: Zhe Wu, Mountain View, CA (US); Vladimir Kolovski, Cambridge, MA (US)

(73) Assignee: Oracle International Corporation, Redwood Shores, CA (US)

( * ) Notice: Subject to any disclaimer, the term of this patent is extended or adjusted under 35 U.S.C. 154(b) by 24 days.

(21) Appl. No.: 13/117,014

(22) Filed: May 26, 2011

(65) Prior Publication Data

US 2012/0303608 A1    Nov. 29, 2012

(51) Int. Cl.
*G06F 17/30* (2006.01)

(52) U.S. Cl.
USPC ........................................ 707/769

(58) Field of Classification Search
USPC ........................................ 707/769
See application file for complete search history.

(56) References Cited

U.S. PATENT DOCUMENTS

| | | | |
|---|---|---|---|
| 5,920,900 A | 7/1999 | Poole et al. | |
| 2002/0120598 A1* | 8/2002 | Shadmon et al. | 707/1 |
| 2003/0229529 A1 | 12/2003 | Mui et al. | |
| 2004/0103105 A1 | 5/2004 | Lindblad et al. | |
| 2004/0153452 A1 | 8/2004 | Carro | |
| 2005/0131583 A1 | 6/2005 | Ransom | |
| 2005/0141519 A1 | 6/2005 | Rajgopa et al. | |
| 2005/0187926 A1 | 8/2005 | Britton et al. | |
| 2006/0106876 A1 | 5/2006 | MacGregor | |
| 2006/0184556 A1 | 8/2006 | Tan et al. | |
| 2008/0098015 A1 | 4/2008 | Davis et al. | |
| 2008/0243908 A1 | 10/2008 | Aasman et al. | |
| 2008/0294644 A1 | 11/2008 | Liu et al. | |
| 2009/0132474 A1* | 5/2009 | Ma et al. | 707/2 |
| 2010/0036788 A1 | 2/2010 | Wu et al. | |
| 2011/0099175 A1 | 4/2011 | Darcy | |
| 2012/0023082 A1* | 1/2012 | Kotha et al. | 707/706 |
| 2012/0110444 A1* | 5/2012 | Li et al. | 715/256 |

OTHER PUBLICATIONS

Advisory Action dated Sep. 27, 2013 for U.S. Appl. No. 13/323,707.
Advisory Action dated Oct. 2, 2013 for U.S. Appl. No. 13/323,730.
Edward Fredkin et al., "Trie Memory", Communication of the ACM, Sep. 1960, 10 pages.
openRDF.org: Home, May 13, 2008, 3 pages url: http://openrdf.org/.
W3C, "RDF Primer" W3C Recommendation, Feb. 10, 2004, 52 pages url: http://www.w3.org/TR/rdf-primer/.
W3C, "SPARQL Query Language for RDF", W3C Recommendation, Jan. 15, 2008, 72 pages url: http://www.w3.org/TR/rdf-sparql-query/.
W3C, "RDF/XML Syntax Specification (Revised)", W3C Recommendation, Feb. 10, 2004, 31 pages url: http://www.w3.org/TR/REC-rdf-syntax/.

(Continued)

Primary Examiner — Hung Q Pham
(74) Attorney, Agent, or Firm — Vista IP Law Group, LLP

(57) ABSTRACT

Disclose is an improved approach for caching lexical values for RDF data. A compact, efficient resource ID to value mapping is stored in memory, where the cache is stored in memory such that the overhead of accessing and updating it is minimized. The advantage of this approach is improved query performance, since the database is performing less work with the in-memory RDF resource caching. In addition, throughput and performance of the database are also improved.

17 Claims, 12 Drawing Sheets

(56) References Cited

OTHER PUBLICATIONS

W3C, "W3C Semantic Web Activity", 4 pages, May 25, 2010 url: http://www.w3.org/2001/sw/.

Final Office Action dated Jul. 16, 2013 for U.S. Appl. No. 13/323,707.

Final Office Action dated Jul. 22, 2013 for U.S. Appl. No. 13/323,730.

Craig Sayers et al., "The Case for Generating URIs by Hashing RDF Content", Technical Report, Aug. 2002, Hewlett Packard Labs.

David Beckett, "The Design and Implementation of the Redland RDF Application Framework" ACM, May 2001, pp. 449-456, Hong Kong.

Non-final Office Action dated Dec. 18, 2012 for U.S. Appl. No. 13/323,707.

Non-final Office Action dated Feb. 28, 2013 for U.S. Appl. No. 13/323,730.

\* cited by examiner

US 8,756,246 B2

METHOD AND SYSTEM FOR CACHING LEXICAL MAPPINGS FOR RDF DATA

BACKGROUND

The semantic web is very significant technology that has been developed for knowledge representation, discovery, and integration for data available on the World Wide Web. To model knowledge in a flexible and extensible way, the World Wide Web Consortium (W3C) has standardized the Resource Description Framework (RDF) to capture the semantics of data. RDF has now become a widely-used language for representing information (metadata) about resources in the World Wide Web. When information has been specified using the generic RDF format, it may be consumed automatically by a diverse set of applications.

There are two standard vocabularies defined on RDF: RDF Schema (RDFS) and the Web Ontology Language (OWL). These vocabularies introduce RDF terms that have special semantics in those vocabularies. For simplicity, in the rest of the document, our use of the term RDF will also implicitly include RDFS and OWL. For more information and for a specification of RDF, see RDF Vocabulary Description Language 1.0: RDF Schema, available at www.w3.org/TR/rdf-schema/, OWL Web Ontology Language Overview, available at www.w3.org/TR/owl-features/, and Frank Manola and Eric Miller, RDF Primer, published by W3C and available in September, 2004 at www.w3.org/TR/rdf-primer/. The RDF Vocabulary Description Language 1.0: RDF Schema, OWL Web Ontology Language Overview, and RDF Primer are hereby incorporated by reference into the present patent application.

Facts in RDF are represented by RDF triples. Each RDF triple represents a fact and is made up of three parts, a subject, a predicate (sometimes termed a property), and an object. For example, the fact represented by the English sentence "John is 24 years old" can be represented in RDF by the subject, predicate, object triple <'John', 'age', '24'>, with 'John' being the subject, 'age' being the predicate, and '24' being the object. In the following discussion, the values in RDF triples are termed lexical values.

With RDF, the values of predicates must ultimately resolve to lexical values termed universal resource identifiers (URIs), and the values of subjects must ultimately resolve to lexical values termed URIs and blank nodes. A URI is a standardized format for representing resources on the Internet, as described in RFD 2396: Uniform Resource Identifiers (URI): Generic Syntax, www.ietf.org/rfc/rfc2396.txt. RFD 2396 is hereby incorporated by reference into the present patent application. In the triples, the lexical values for the object parts may be literal values. In RDF, literal values are strings of characters, and can be either plain literals (such as "Immune Disorder") or typed literals (such "2.4"^^xsd:decimal). The interpretations given to the lexical values in the members of the triple are determined by the application that is consuming it. For a complete description of RDF, see Frank Manola and Eric Miller, RDF Primer, published by W3C and available in September 2004 at www.w3.org/TR/rdf-primer/. The RDF Primer is hereby incorporated by reference into the present patent application.

Various approaches have been developed to efficiently store RDF data into database accessible formats. In some known approaches, the RDF data is represented using integer data values, which can thereafter be translated into a lexical form. For example, U.S. Patent Publication 2008/0126397 describes an approach for representing RDF data using two tables, a first "Links" Table that uses ID values to capture relationships between the objects in the RDF data, and a second "Values" Table which includes the lexical values corresponding to those ID values. The Links Table allows for representations of graph relationships between objects using connectivity, where the subject and objects of RDF triples are mapped to nodes, and the predicates are mapped to links that have subject start-nodes and object end-nodes. A link in the Links Table, therefore, represents a complete RDF triple. To speed up the efficiency of processing and storage of the Links, Table, this table only includes ID values—without including any lexical values. The Values Table would be checked in order to obtain the lexical value of the RDF triples.

FIG. 3 illustrates one possible approach to implement the Values table, Links table, and their connections. In the example of FIG. 3, the Values table 300 stores three records 301, 302, 303 for the different text values. For example, the text value ValueName1 is associated with the unique ID ValueID 1. The text value ValueName2 is associated with the unique ID of ValueID2. The text value ValueName3 is associated with the unique ID of ValueID3. A record 351 exists in the Links table 350 for a triple associated with a unique Link ID. In this record 351, the Start Node ID is ValueID1, the P Value ID is ValueID2, and the End Node ID is Value ID3. A complete triple is thus obtainable through its Link ID (LinkID1), as the text values of the subject, predicate, and object of the triple can be accessed through the Start Node ID, P Value ID, and End Node ID associated with the Link ID. If a second record 352 in the Links table has the same subject text value of ValueName1, then ValueID1 would be stored as the Start Node ID and associated with the Link ID (LinkID2) of the second record 352. In this manner, two triples can reference the same text value without redundantly storing the text value.

Therefore, this type of an approach for storing RDF triples hashes the lexical forms of RDF resources into numerical IDs (e.g., 64-bit numerical Value IDs) and stores the mappings of resource id to resource value in the separate Values table 300. This approach is advantageous for a number of reasons. First, when performing joins, it is much faster to compare and join the numeric IDs than using the original lexical values of the RDF resources. In addition, an RDF resource usually occurs multiple times in a set of triples. Storing it as a 64-bit ID numeric will produce significant storage savings. Also, B-Tree indexes on numeric IDs produce storage savings as well.

However, there are some disadvantages to this approach of requiring access to the Values table during a query. This is because, after all of the Links table joins have been performed, there will still be the need to join with the Values table to retrieve the original resource values. Depending on how many variables need to be selected, this introduces additional joins with the Values table. The overhead of the Values table is more noticeable if, when sorting queries, all of the selected columns' bindings are joined with Values and involved in the sort, even though only the sorting column needs to be considered. In addition, there are excessive costs with queries that produce a significant number of matches, since using nested loop against Values table is not efficient and using hash join may also be inefficient because the database has to hash the whole Values table.

Therefore, there is a need for an improved approach for implementing queries and access to the lexical form of RDF data.

SUMMARY

Some embodiments of the present invention are directed to an approach for caching lexical values for RDF data. A compact, efficient resource ID to value mapping is stored in memory, where the cache is stored in memory such that the overhead of accessing and updating it is minimized. The advantage of this approach is improved query performance, since the database is performing less work with the in-memory RDF resource caching. In addition, throughput and performance of the database are improved as well.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

Some embodiments of the present invention are directed to an approach for caching lexical values for RDF data. A compact, efficient resource ID to value mapping is stored in memory, where the cache is stored in memory such that the overhead of accessing and updating it is minimized. The advantage of this approach is improved query performance, since the database is performing less work with the in-memory RDF resource caching. In addition, throughput and performance of the database are improved as well.

Figure 1:
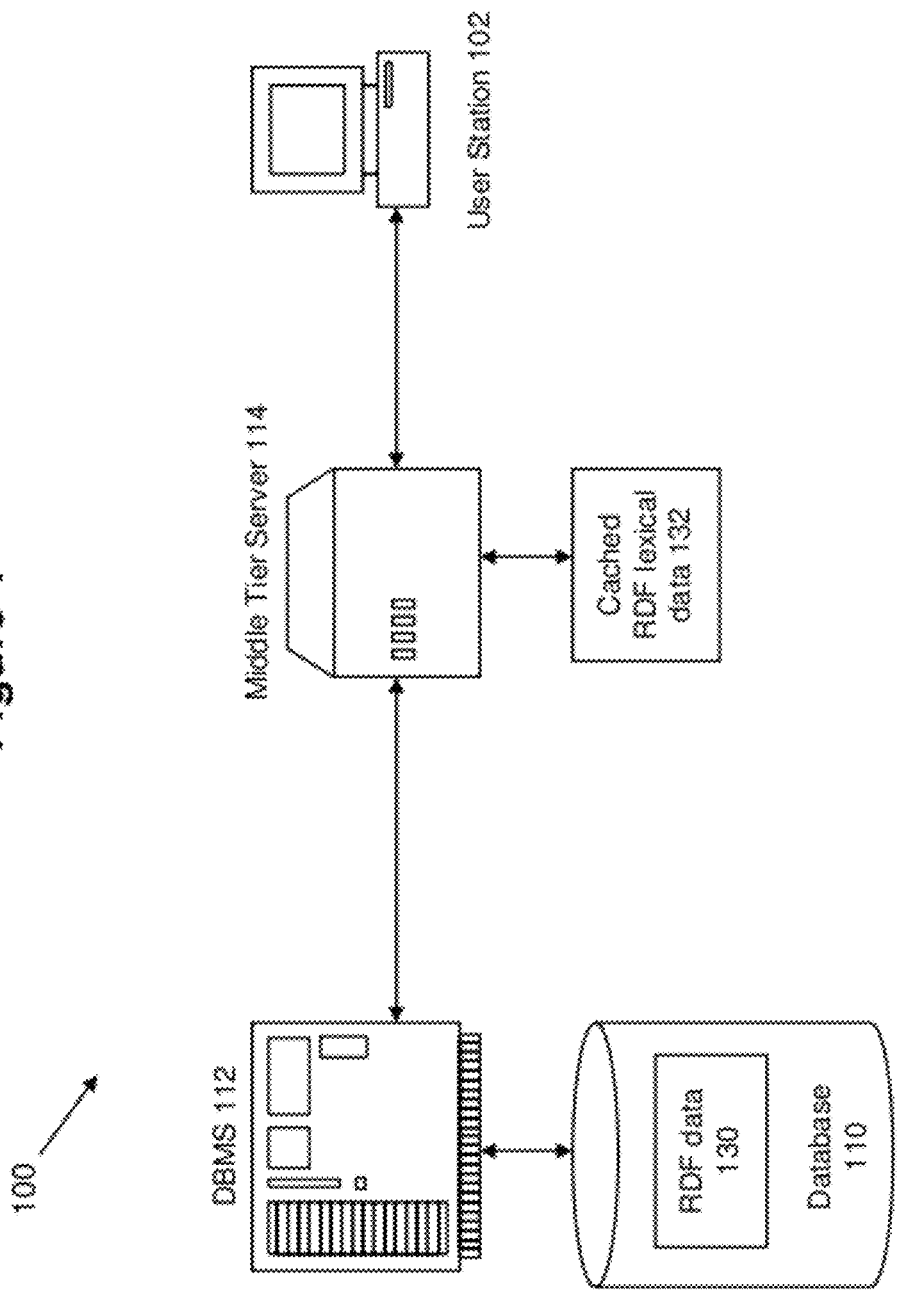
FIGS. 1 and 2 illustrate example systems according to embodiments of the invention for performing RDF caching.

FIG. 1 shows an architecture of a system 100 for implementing cached RDF lexical data according to some embodiments of the invention. System 100 may include one or more users at one or more user stations 102 that utilize a database management system (DBMS) 112 to access RDF data 130 in a database 110. The users at user station 102 correspond to any individual, organization, or other entity that uses system 100 for accessing RDF data 130. User station 102 comprises any type of computing station that may be used to operate or interface with DBMS 112. Examples of such user stations 102 include for example, workstations, personal computers, or remote computing terminals. User station 102 comprises a display device, such as a display monitor, for displaying information and data to users at the user station 102. User station 102 also comprises one or more input devices for the user to provide operational control over the activities of system 100, such as a mouse or keyboard to manipulate a pointing object in a graphical user interface.

RDF data 130 may be stored in database 110 on one or more computer readable mediums or storage devices. The computer readable storage devices comprise any combination of hardware and software that allows for ready access to the data within database 110. For example, the computer readable storage device could be implemented as computer memory or disk drives operatively managed by an operating system.

As previously discussed, the RDF data 130 is formatted using the RDF language such that facts in this language are represented by RDF triples. Each RDF triple represents a fact and is made up of three parts, a subject, a predicate, and an object. There may be numeric ID values that are used to map to the lexical representations of the RDF data 130. For example the approach of U.S. Patent Publication 2008/0126397 may be employed to utilize numeric value IDs to represent RDF data, where the numeric value IDs correspond to lexical values stored in a Values table. U.S. Patent Publication 2008/0126397 is hereby incorporated by reference in its entirety.

Figure 2:
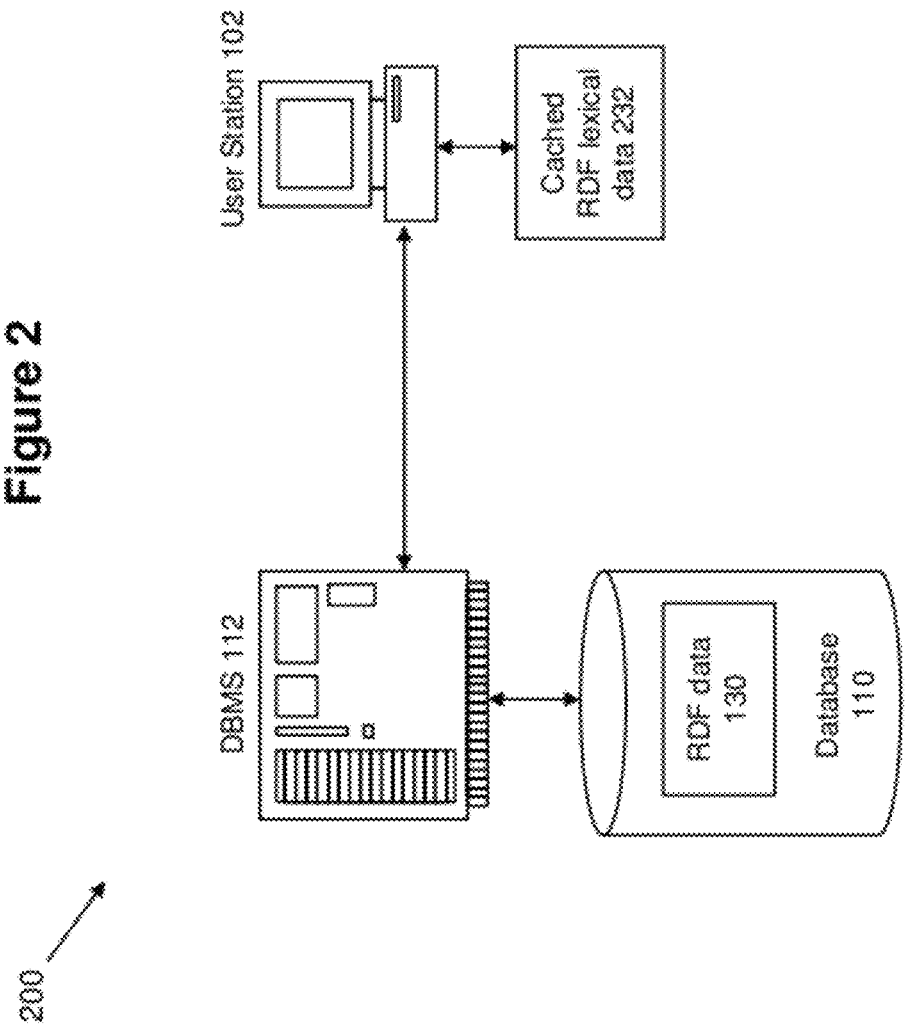
Figure 3:
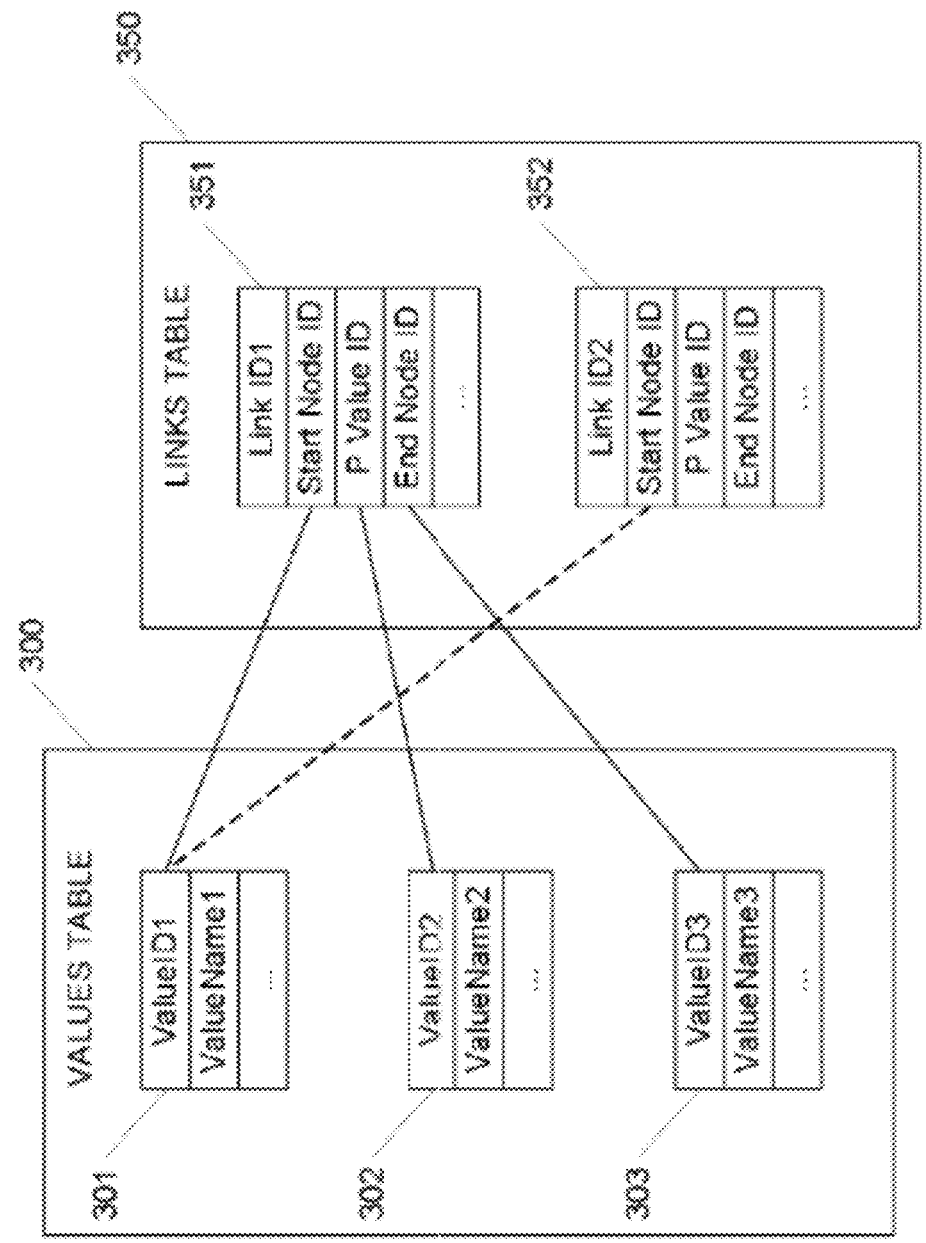
FIG. 3 illustrates a possible approach for storing RDF data in a database.

According to some embodiments of the invention, RDF lexical mappings data 132 is maintained and/or cached to either minimize or avoid the need to access the Values table at query/run time to obtain the lexical values. Instead, the lexical mappings cache 132 will include cached lexical values that can be retrieved for numeric value IDs without performing a join operation against a database table of lexical values. It is noted that some or all of the components identified in FIGS. 1 and 2 (which may be expanded upon in more detail below) may be implemented using the architecture described with respect to FIG. 11.

According to a current embodiment, the RDF lexical mappings cache 132 is implemented using a compact and resource-efficient mapping structure that is stored in memory. The cache 132 is stored in memory such that the overhead of accessing and updating it is minimized. According to some embodiments, the cache 132 is implemented to be memory-efficient so that as many unique RDF values as possible can be stored in small sized memory configurations (e.g., 2-4 GByte) and so that the cache 132 can be scaled appropriately.

It is noted that lexical mappings cache 132 may be located anywhere that is convenient to efficiently utilize cache 132 within system 100. For example, FIG. 1 shows an approach in which the cache 132 is implemented at a middle tier server 114. In this approach, any number of users at any number of user stations 102 may access a common cache 132 to obtain lexical values for the RDF data 130. In the alternative embodiment of FIG. 2, the cached RDF lexical mapping data 232 is located at the user station 102. This approach allows the user at user station 102 to access cache 232 without requiring the cache access to go through a middle tier server 114. However, this approach may also be disadvantageous compared to the approach of FIG. 1 since the cached mappings data 232 may not be shareable across multiple user stations 102. In addition, it is likely that the available memory at a normal user station 102 is not going to be as large as the available memory at a typical middle tier server 114, and hence the cache 232 at the user station 102 will likely contain much less cached mappings data than the cache 132 at the middle tier server 114.

According to some embodiments of the invention, the cached lexical mappings data is implemented by caching and indexing the mappings data using prefix trees. The prefix tree is used to essentially cache common portions of prefixes within the RDF data, while an index is employed to access those portions of the prefix tree that relate to specific items of RDF data.

Figure 4A:
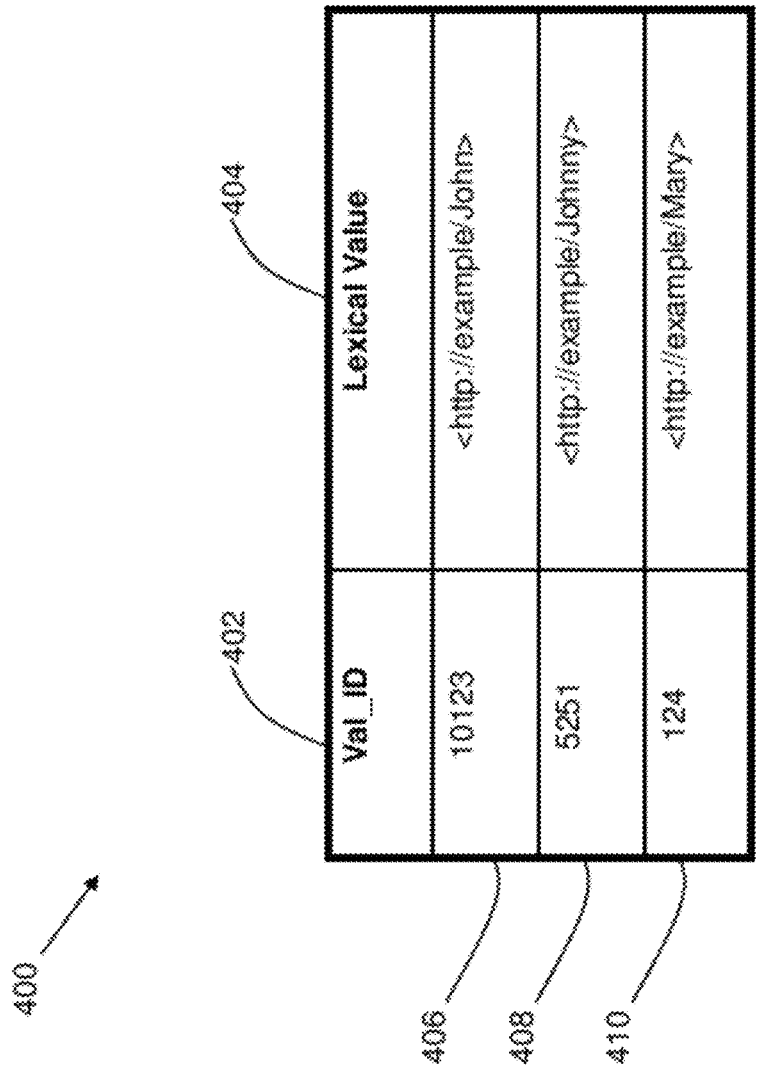
FIG. 4A illustrates an example set of RDF data with lexical values.

To illustrate, consider an example set of RDF data shown in FIG. 4A. The table 400 represents the type of data that would be included in a Values Table to map between numeric value IDs and their corresponding lexical values. Therefore, table 400 includes a first column 402 to contain value IDs, which in the current example is an integer value. A second column 404 includes the lexical values that relate to the value IDs.

Here, row 406 includes information to relate a value ID of "10123" to the lexical value of "<http://example/John>". Row 408 includes information to relate a value ID of "5251" to the lexical value of "<http://example/Johnny>" and row 410 includes information to relate a value ID of "124" to the lexical value of "<http://example/Mary>". While only three rows are shown in this example, it is clear that the normal scenario in the real world would likely involve a very large number of such rows in a typical Values Table for many such ID-to-lexical relationships.

If this type of information is only maintained in a Values Table (such as the table 400 shown in FIG. 4A) without being cached, then a typical query against RDF data in a Links Table that results in multiple value IDs that would also potentially require many joins against the data in table 400 to obtain the lexical values to return to a user. If the table 400 is very large, then this process of performing joins against table 400 could be very costly, requiring a large amount of time, network costs, and computing resources.

Figure 4B:
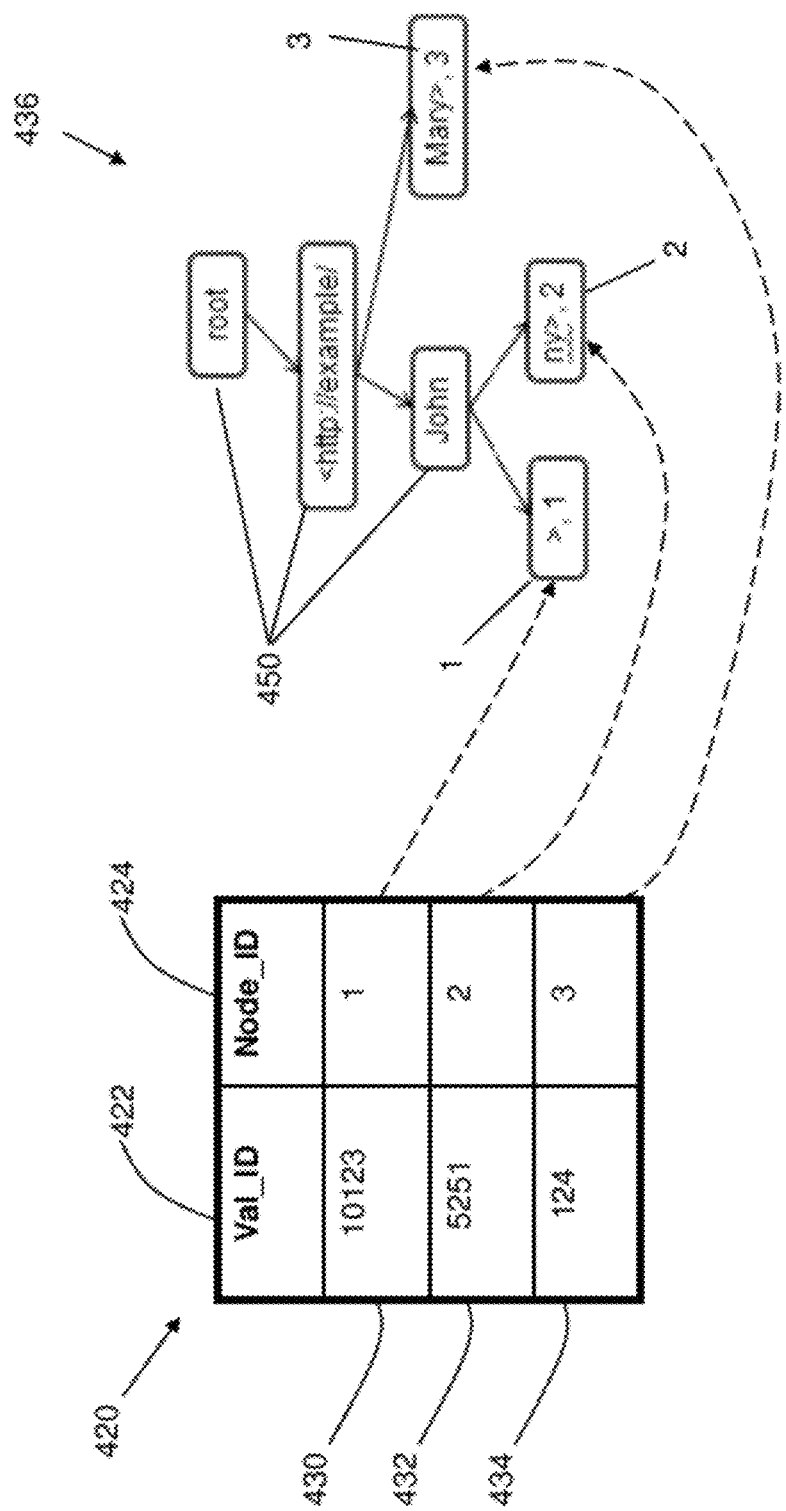
FIG. 4B illustrates a prefix tree to map the data of FIG. 4A.

FIG. 4B illustrates the approach of using a prefix tree 436 to implement cached lexical mappings for the data shown in FIG. 4A according to some embodiments of the invention. The prefix tree 436 includes nodes 450 that pertain to commonly shared portions or prefixes of the lexical values in the RDF data. The leaf nodes 1, 2, and 3 in the prefix tree 436 relate to different suffix values for the cached RDF data. The combination of the prefix values in nodes 450 and the suffix values in nodes 1, 2, and 3 form the lexical values shown in column 404 of FIG. 4A.

For example, it can be seen that the combination of values in prefix nodes 450 ("<http://example/John") with the value in the suffix/leaf node 1 (">") collectively forms the lexical value "<http://example/John>". This exactly matches the value in column 404 of row 406 in FIG. 4A. Similarly, the combination of values in prefix nodes 450 ("<http://example/John") with the value in the suffix/leaf node 2 ("ny>") collectively forms the lexical value "<http://example/Johnny>", which exactly matches the value in column 404 of row 408 in FIG. 4A. Likewise, the combination of values in the first two nodes of prefix nodes 450 ("<http://example/") with the value in the suffix/leaf node 3 ("Mary>") collectively forms the lexical value "<http://example/Mary>", which matches the value in column 404 of row 410 in FIG. 4A.

An index table 420 can be used to map the value IDs to the nodes within prefix tree 436 that relate to the value ID. Each entry in the index 420 points to a node id in the prefix tree 436, where the index 420 includes a first column 422 to hold the value ID and a second column 424 to hold the node identifier in the prefix tree 436. Here, entry 430 relates to value ID "10123", and points to node 1 in prefix tree 436. In order to obtain the full lexical value corresponding to this value ID, one only needs to traverse the tree 436 from the starting node to the root. For example, value ID "10123", entry 430 in index 420 points to node 1. By traversing in a direction reverse to the arrows drawn in the tree structure 436, the lexical value (i.e., "<http://example/John>") for the URI that pertains to this value ID (i.e., "10123") can be obtained.

Similarly, entry 432 relates to value ID "5251", and points to node 2 in prefix tree 436. To obtain the full lexical value corresponding to this value ID, the tree 436 is traversed from the starting node 2 to the root. By traversing in a direction reverse to the arrows drawn in the tree structure 436 from node 2, the lexical value (i.e., "<http://example/Johnny>") for the URI that pertains to this value ID (i.e., "5251") can be obtained. For entry 434 that relates to value ID "124" and points to node 3 in prefix tree 436, the full lexical value corresponding to this value ID can also be obtained by traversing the tree 436. By traversing in a direction reverse to the arrows drawn in the tree structure 436 from node 3, the lexical value (i.e., "<http://example/Mary>") for the URI that pertains to this value ID (i.e., "124") can be obtained.

This approach takes advantage of the nature of RDF resources, which generally includes URIs, blank nodes, and literals. Since URIs (and generated bnodes) usually share prefixes, storing the values in a prefix tree structure provides significant compression advantages.

Figure 5:
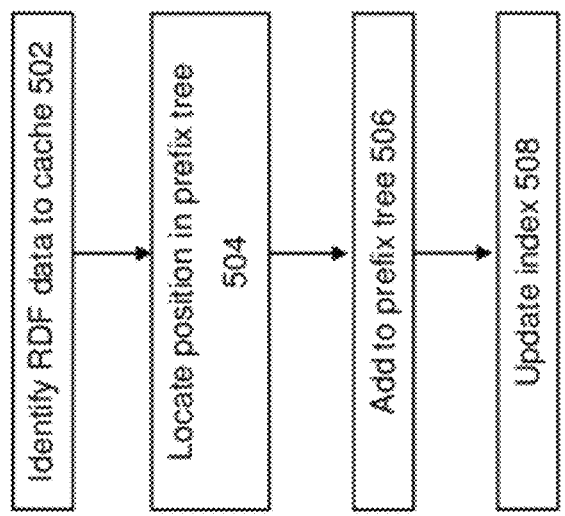
FIG. 5 shows a flowchart of an approach for using a prefix tree to cache RDF data according to an embodiment of the invention.

FIG. 5 shows a flowchart of an approach for populating a prefix tree to cache RDF mapping data according to some embodiments of the invention. At 502, data is identified for caching. In one embodiment, lexical mappings are cached for the data that can be suitability stored in the prefix tree, e.g., URI data. As discussed in more detail below, it is also possible in some embodiments that only some of the data is cached in its entirety in the prefix tree, to obtain savings in memory usage (e.g., by using a sampling approach to identify the data to be stored in its entirety in the tree).

At 504, the appropriate position is located in the prefix tree to include the mapping for the lexical value of the RDF data. This action is performed by traversing the prefix tree to identify a match for the prefix portion of the RDF data. In some embodiments, this traversal of the prefix tree is performed in a top-down direction starting from the root, in an attempt to identify a set of node(s) in the prefix tree that most closely match as much of the lexical value as possible. This identifies the possible position for the leaf node to store the suffix of the RDF data, to hold the portion of the lexical data that is not otherwise already represented by the existing nodes within the prefix tree.

Next, at 506, the appropriate suffix node(s) are created in the prefix tree. For the specific RDF data that is being added, a suffix tree is created for the portion of that RDF data that does not already exist within the prefix tree. In addition, it is possible that a new leaf node is created to correspond to existing suffix, e.g., because a previous leaf node is split to add the new leaf node. For example, in the example of FIG. 4B, it is possible that in the process to add the new node for the "http://example.johnny>" value when the tree 436 already contained a node for the "http://example.john>" value, an existing leaf node was split to permit the addition of nodes 1 and 2, where node 1 is added even though the "http://example.john>" value was already represented in the tree 436.

At 508, an index is updated to reflect the changes to the tree. The index is modified to include pointer(s) to the newly added or modified nodes in the tree which relate to the value IDs affected by the tree modification.

Figure 6:
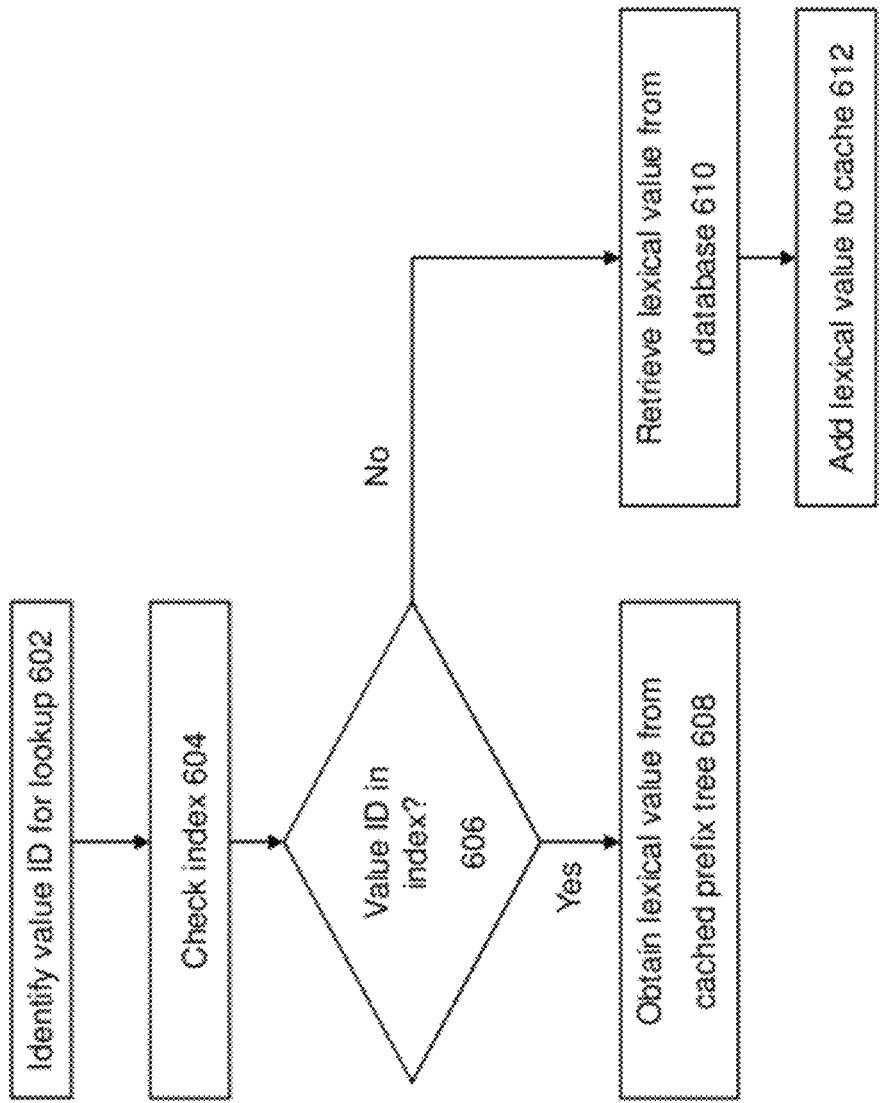
FIG. 6 shows a flowchart of an approach for accessing a prefix tree to obtain RDF data according to an embodiment of the invention.

FIG. 6 shows a flowchart of an approach for performing a lookup against the mapping data to obtain a lexical value from the cached RDF lexical mapping data. At 602, a value ID is identified for which there is a desire to perform a lexical look-up. According to some embodiments of the invention, this identification is made because a database optimizer realizes or is made aware of the existence of the cache. On this basis, the database optimizer then realizes that a join does not need to be made against the Values table to obtain a lexical value for a value ID. Instead, the cache can be accessed to obtain the necessary lexical value that corresponds to a given a value ID. One possible way to make the database optimizer aware of the cache is to insert a pragma directive into a query statement, where the pragma identifies the cache. For example, a SPARQL query can be implemented that includes a "PREFIX" portion as a pragma to alert an optimizer of the existence of a middle tier cache, along with the location of that cache.

Upon recognition of this pragma, the database system will not immediately operate by performing a join with the Values Table. Instead, at 604, the index is checked for each numeric value ID that is sought to be returned. A determination is made at 606 whether the numeric value ID exists in the index.

If that numeric value ID exists in the index, then this means that the lexical value for that numeric value ID has been cached. Therefore, at 608, the lexical value can be obtained from the cache. According to a current embodiment, this action is performed by using the index to identify the node which corresponds to the numeric value ID. Starting at that node, the prefix tree is traversed in an upwards direction to obtain the lexical value.

If the numeric value ID does not exist in the index, then this means that the corresponding lexical value has not previously been cached. Therefore, at 610, the lexical value will need to be retrieved from the database, e.g., by performing a join operation between the Values table and the Links table using the numeric value ID to obtain the lexical value. Thereafter, at 612, the lexical value can be added to the cache so that future queries for this value can be resolved using the cache.

For further memory optimization, some embodiments of the invention can be implemented such that only some of the RDF values are actually stored in the prefix tree. In this approach, only a sampled subset of the values is stored in the prefix tree, with the rest stored in a suffix buffer. When a new value is to be stored, if the prefix of it occurs in the prefix tree, then a first pointer is stored to point to the relevant prefix node and a second pointer is added to point to the suffix location in the suffix buffer.

Figure 7:
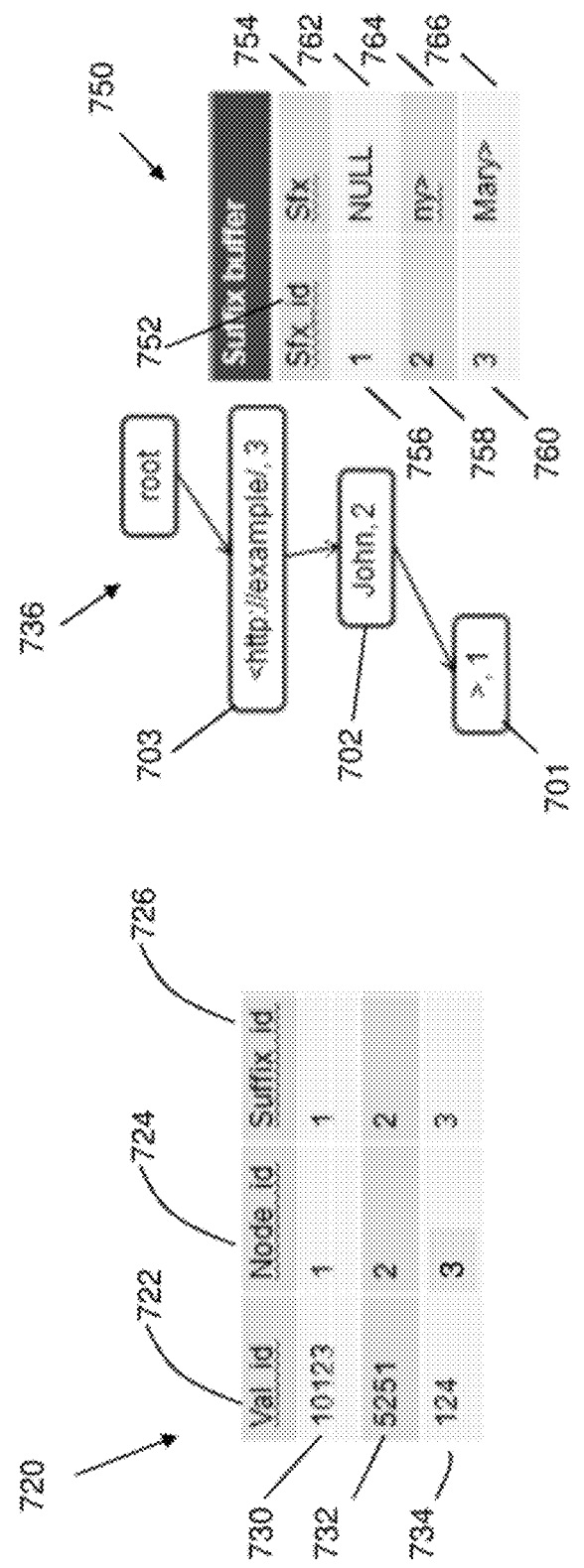
FIG. 7 illustrates usage of a suffix buffer according to an embodiment of the invention.

FIG. 7 shows an example of this approach. Assume that the RDF data of FIG. 4A is the set of data that is being cached in the structures of FIG. 7. As before, a prefix tree 736 is used to implement cached lexical mappings for the data shown in FIG. 4A. The prefix tree 736 includes nodes that pertain to commonly shared portions or prefixes of the lexical values 404 in the RDF data of FIG. 4A.

However, the prefix tree 736 does not include mappings for all the data that is being cached. Instead, the example prefix tree 736 of FIG. 7 only includes the lexical value in its entirety (at 701 for node ID 1) corresponding to the lexical value "<http://example/John>" which matches the value in column 404 of row 406 in FIG. 4A.

The suffix buffer 750 is used to address the other lexical values from table 400 of FIG. 4A which are not entirely represented in the prefix tree 736. The suffix buffer 750 includes a column 752 to identify a particular suffix ID value, which is the pointer into the suffix buffer 750. Column 754 includes the actual suffix value that is not included in the prefix tree 736. For example, item 764 contains the suffix value "ny>", which previously was included in prefix tree 436 as node 2 in FIG. 4B. However, unlike tree 436 in FIG. 4B, this suffix is not stored in prefix tree 736 of FIG. 7. Therefore, this suffix value is stored in the suffix buffer 750 in row 758 within item 764. Similarly, item 766 contains the suffix value "Mary>", which previously was included in prefix tree 436 of FIG. 4B as node 3. Unlike tree 436 of FIG. 4B, this suffix is not stored in prefix tree 736 of FIG. 7. Therefore, this suffix value is stored in the suffix buffer 750 in row 760 within item 766. As previously noted, the entirety of the lexical value "<http://example/John>" is already being stored within tree 736. Therefore, the entry 756 for this value in suffix tree 750 includes a NULL value in column 754 in item 762.

An index table 720 can be used to map the value IDs to the nodes within prefix tree 736 and the suffix buffer 750. Each entry in the index 720 points to a node id in the prefix tree 736 and a suffix id in the suffix buffer 750. The index 720 includes a first column 722 to hold the value ID, a second column 724 to hold the node identifier in the prefix tree 436, and a third column 726 to hold the suffix identifier in the suffix buffer 750.

In order to obtain the full lexical value corresponding to this value ID, one only needs to traverse the tree 736 from the starting node to the root for the prefix portion of the lexical value. The suffix portion would be obtained by following the suffix id pointer to the appropriate location in the suffix buffer 750.

For example, for value ID "10123", entry 730 in index 720 points to node ID 1 (701 in tree 736) for the node ID value. By traversing in a direction reverse to the arrows drawn in the tree structure 736, the lexical value of the prefix (i.e., "<http://example/John>") for the URI that pertains to this value ID (i.e., "10123") can be obtained. The suffix ID 1 (756 in suffix buffer 750) is checked to see if there is an additional suffix value that should be combined with the prefix for the lexical value. Here, entry 756 in suffix buffer 750 indicates in column 754 that item 762 has a value of NULL. Therefore, the entirety of the lexical value is contained in the prefix tree 756.

Similarly, for value ID "5251", entry 732 in index 720 points to node ID 2 (702 in tree 736) for the node ID value. By traversing in a direction reverse to the arrows drawn in the tree structure 736, the lexical value of the prefix (i.e., "<http://example/John") for the URI that pertains to this value ID (i.e., "5251") is obtained. The suffix ID 2 (758 in suffix buffer 750) is checked to see if there is an additional suffix value that should be combined with the prefix for the lexical value. Here, entry 758 in suffix buffer 750 indicates in column 754 that item 764 has a value of "ny>" that should be combined with the prefix value. Therefore, the lexical value is the prefix value ("<http://example/John") from tree 736 combined with the suffix value ("ny>") from item 764 in the suffix tree to form the final lexical value ("<http://example/Johnny>").

For value ID "734", entry 734 in index 720 points to node ID 3 (703 in tree 736) for the node ID value. By traversing in a direction reverse to the arrows drawn in the tree structure 736, the lexical value of the prefix (i.e., "<http://example/") for the URI that pertains to this value ID (i.e., "124") is obtained. The suffix ID 3 (entry 760 in suffix buffer 750) is checked to see if there is an additional suffix value that should be combined with the prefix for the lexical value. Here, entry 760 in suffix buffer 750 indicates in column 754 that item 766 has a value of "Mary>" that should be combined with the prefix value. Therefore, the lexical value is the prefix value ("<http://example/") from tree 736 combined with the suffix value ("Mary>") from item 766 in the suffix tree to form the final lexical value ("<http://example/Mary>").

Figure 8:
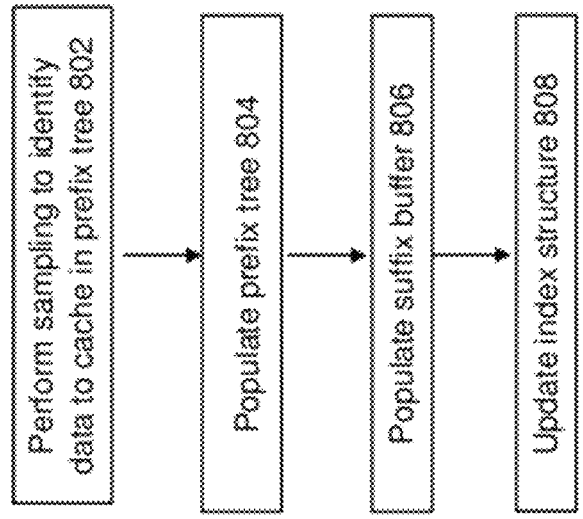
FIG. 8 shows a flowchart of an approach for using a prefix tree and a suffix buffer to cache RDF data according to an embodiment of the invention.

FIG. 8 shows a flowchart of an approach for populating a cache according to some embodiments of the invention, where only some of the mapped values are entirely represented in the prefix tree. At 802, a determination is made of the subset of lexical values to cache in the prefix tree. In some embodiments, sampling is performed to identify which of the RDF data values should be represented in the prefix tree. The idea is that data values that are more common should be represented in the prefix tree, while less common values should be buffered in the suffix buffer. Any suitable sampling rate can be utilized to perform this type of sampling, e.g., with a sampling rate of 100, 100, or somewhere between 100 and 1000.

At 804, the identified data values are added to the prefix tree. As previously noted, it is expected that the most commonly repeated prefix values are therefore represented in the prefix tree. At 806, the suffix buffer is populated to include the suffix values that are otherwise not already represented in the prefix tree. In some embodiments, a NULL value is included into the suffix buffer to lexical values that are already fully represented in the prefix tree. At 808, the index structure is updated to reflect pointers to the node in the prefix tree and the position in the suffix buffer which combine to represent particular lexical values.

Figure 9:
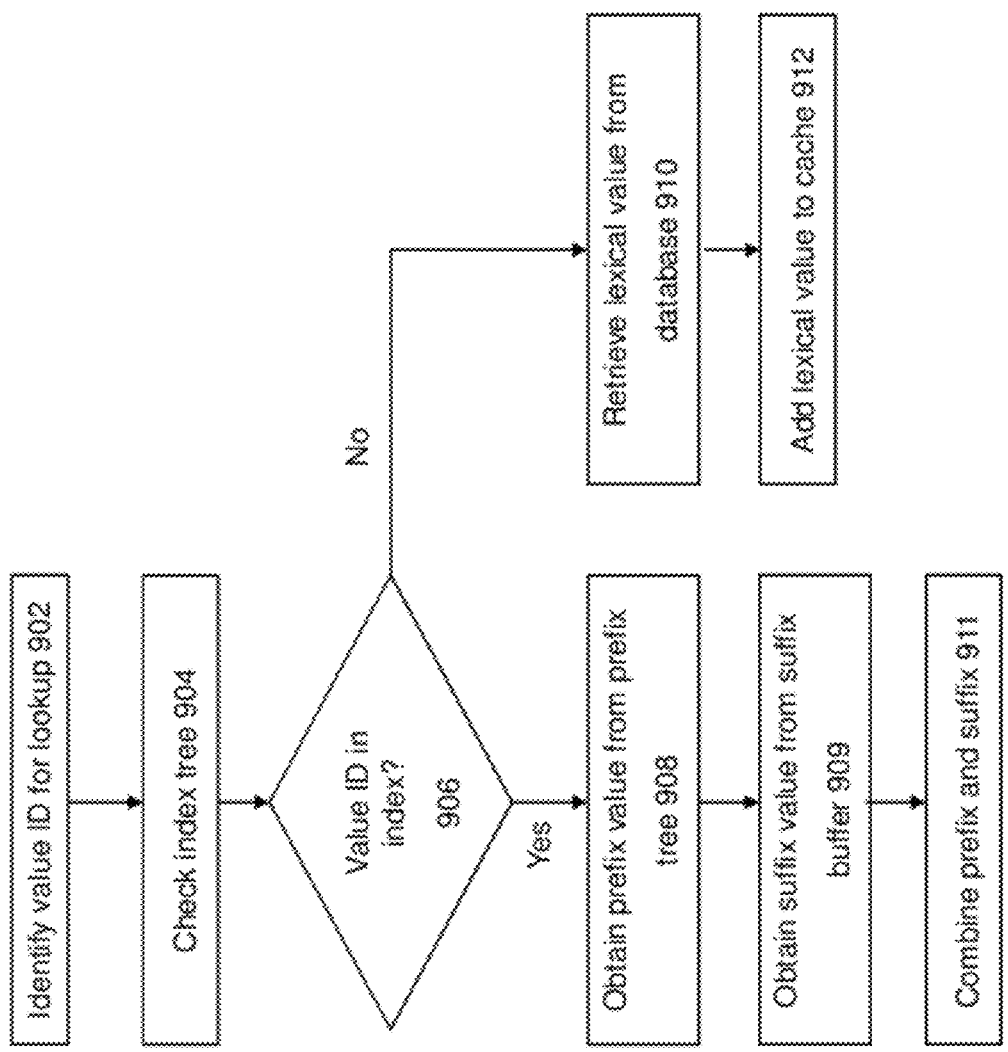
FIG. 9 shows a flowchart of an approach for accessing a prefix tree and a suffix buffer to obtain RDF data according to an embodiment of the invention.

FIG. 9 shows a flowchart of an approach for performing a lookup against the prefix tree and suffix buffer structures to obtain a lexical value from the cached RDF lexical mapping data. At 902, a value ID is identified for which there is a desire to perform a lexical look-up. At 904, the index is checked for each numeric value ID that is sought to be returned. A determination is made at 906 whether the numeric value ID exists in the index.

If that numeric value ID exists in the index, then this means that the lexical value for that numeric value ID has been cached. Therefore, at 908, the prefix for the lexical value is obtained from the prefix tree. This action is performed by using the index to identify the node which corresponds to the numeric value ID. Starting at that node, the prefix tree is traversed in an upwards direction to obtain the lexical value. At 909, the suffix value is obtained from the suffix buffer. This action is performed by following the pointer in index to the position in the suffix buffer that corresponds to the value ID, and retrieving the suffix value from the buffer. At 911, the prefix value and suffix value (if any) are combined to obtain the lexical value.

If the numeric value ID does not exist in the index, then this means that the corresponding lexical value has not previously been cached. Therefore, at 910, the lexical value will need to be retrieved from the database, e.g., by performing a join operation between the VALUE table and the LINKS table using the numeric value ID to obtain the lexical value. Thereafter, at 912, the lexical value can be added to the cache so that future queries for this value can be resolved using the cache.

In some embodiments, a partitioned index can be used to store the keys (value IDs) and the pointers to nodes in the prefix tree. The reason for using partitions is that a partition can be manipulated independently of other partitions and therefore can be used to increase concurrency. For example, in the case of memory shortage, one or multiple partitions and be dropped to save space. One way to partition is to use a few least significant bits of the value IDs as the partition key.

Figure 10:
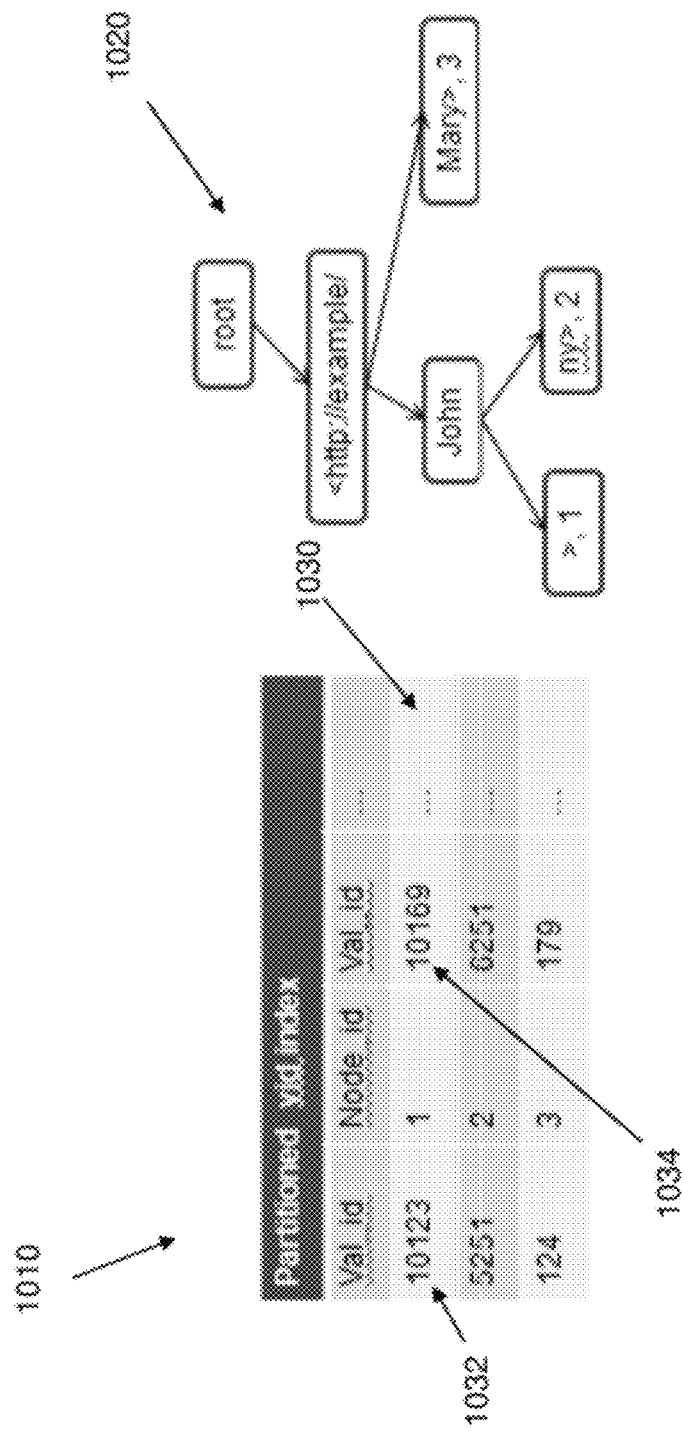
FIG. 10 illustrates partitioning according to an embodiment of the invention.

FIG. 10 shows an example of this approach. The index 1010 in FIG. 10 has multiple rows, where each row represents a separate partition in the index. The partition may correspond to multiple value IDs, and hence relate to multiple lexical values. Each partition is sorted by the value ID for faster access, where each entry in the index points to a node id in the prefix tree 1020.

For example, row 1030 includes an entry 1032 for value id "10123" and another entry 1034 for value ID "10169", where both value IDs are located in the same partition. There are also additional entries that may exist in row 1030 for additional value IDs in this partition. The value IDs in this partition all share some common bits in the value ID. Here, the value ID "10123" and "10169" share the same first few bits of the numeric values. For this reason, they have been placed in the same partition (and hence represented in index 1010 in the same row 1030).

Cache maintenance may be performed on a partition basis according to some embodiments of the invention. For example, consider the situation when the available memory is insufficient to hold all of the previously identified ID-to-lexical mappings. In this situation, some of the mappings may need to be removed from the in-memory cache. This type of operation can be performed on a partition basis to address multiple items of data at the same time, which may more efficiently facilitate such maintenance operations. A least recently used (LRU) algorithm may be applied to identify the set of data to be removed from the in-memory cache.

Therefore, what has been described is an improved approach for improving query performance for RDF data. Because the database is performing less work with the in-memory RDF resource caching of embodiments of the invention, the throughput and performance of the database is improved as well. Since semantic web technologies are maturing and gaining more and more traction in the whole industry, providing fast query response time is becoming ever more critical. The performance optimization of embodiments of the invention will produce significant improvements in query time.

System Architecture Overview

Figure 11:
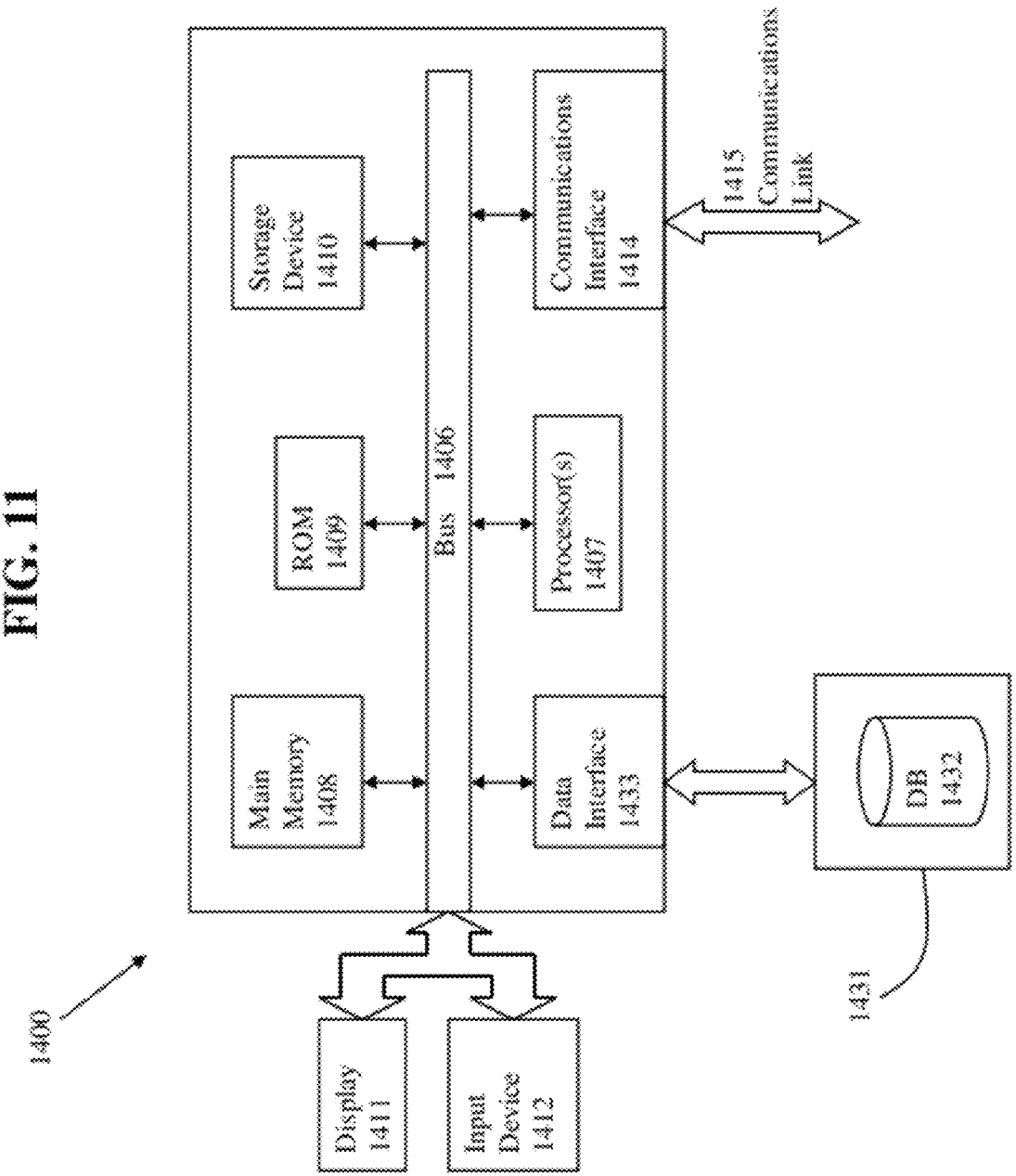
FIG. 11 depicts a computerized system on which an embodiment of the invention can be implemented.

FIG. 11 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method implemented with a processor for using cached lexical values for RDF data, comprising:
   identifying a query to be processed upon RDF data;
   determining whether a data structure contains an entry associated with lexical mapping information corresponding to the identified query; and
   if the entry is determined to exist within the data structure, retrieving a lexical value for the query from a cache which stores lexical values using a prefix tree comprising one or more nodes storing common prefix portions of the stored lexical values,
   wherein retrieving the lexical value from the cache comprises identifying a node of the prefix tree corresponding to the entry using the lexical mapping information, and retrieving the lexical value by traversing the prefix tree from the identified node; or
   if the entry is determined to not exist within the data structure, retrieving the lexical value corresponding to the identified query from a database.

2. The method of claim 1 in which the prefix tree comprises root nodes for common prefix elements of the lexical values.

3. The method of claim 1 in which leaf nodes of the prefix tree comprise suffix values for the lexical values.

4. The method of claim 1 in which the data structure comprises an index table maintained to track mappings of the lexical values in the prefix tree.

5. The method of claim 4 in which the index table comprises numerical value identifiers and node identifier values in the prefix tree.

6. The method of claim 1 in which a suffix buffer is maintained to track suffix values.

7. The method of claim 6 in which sampling is performed to identify a subset of the lexical values to fully represent in the prefix tree.

8. The method of claim 6 in which each of the lexical values are represented by a combination of a suffix value and a prefix value.

9. The method of claim 6 in which the data structure comprises an index table maintained to track mappings of the lexical values in the prefix tree and the suffix buffer.

10. The method of claim 9 in which the index table comprises numerical value identifiers, node identifier values in the prefix tree, and pointers into the suffix buffer.

11. The method of claim 1 in which the cached lexical values are maintained at a mid-tier cache or a user station cache.

12. The method of claim 1, wherein if the entry is determined to not exist within the data structure, a join operation is performed against a table having the lexical values to retrieve the lexical value for the RDF data from the database.

13. The method of claim 1 in which if the entry is determined to not exist within the data structure, the lexical value retrieved from the database is added to the cache.

14. The method of claim 1 in which the data structure is partitioned.

15. The method of claim 14 in which partitions for the data structure are used to implement maintenance operations upon the data structure.

16. A computer program product embodied on a computer usable medium, the computer readable medium having stored thereon a sequence of instructions which, when executed by a processor causes the processor to execute a method for using cached lexical values for RDF data, the method comprising:
   identifying a query to be processed upon RDF data;
   determining whether a data structure contains an entry associated with lexical mapping information corresponding to the identified query; and
   if the entry is determined to exist within the data structure, retrieving a lexical value for the query from a cache which stores lexical values using a prefix tree comprising one or more nodes storing common prefix portions of the stored lexical values,
   wherein retrieving the lexical value from the cache comprises identifying a node of the prefix tree corresponding to the entry using the lexical mapping information, and retrieving the lexical value by traversing the prefix tree from the identified node; or
   if the entry is determined to not exist within the data structure, retrieving the lexical value corresponding to the identified query from a database.

17. A computer-based system for using cached lexical values for RDF data, comprising:
   a computer processor to execute a set of program code instructions;
   a memory to hold the program code instructions, in which the program code instructions comprises program code to identify a query to be processed upon RDF data, determine whether a data structure contains an entry associated with lexical mapping information corresponding to the identified query, and
   if the entry is determined to exist within the data structure, retrieve a lexical value for the query from a cache which stores lexical values using a prefix tree comprising one or more nodes storing common prefix portions of the stored lexical values,
   wherein retrieving the lexical value from the cache comprises identifying a node of the prefix tree corresponding to the entry using the lexical mapping information, and retrieving the lexical value by traversing the prefix tree; or
   if the entry is determined to not exist within the data structure, retrieve the lexical value corresponding to the identified query from a database.

* * * * *

UNITED STATES PATENT AND TRADEMARK OFFICE
CERTIFICATE OF CORRECTION

PATENT NO.        : 8,756,246 B2
APPLICATION NO.   : 13/117014
DATED             : June 17, 2014
INVENTOR(S)       : Wu et al.

Page 1 of 1

It is certified that error appears in the above-identified patent and that said Letters Patent is hereby corrected as shown below:

On the Title Page, Item (57) Abstract, line 1, delete "Disclose" and insert -- Disclosed --, therefor.

In the Specification

In column 1, line 47, delete "RFD" and insert -- RDF --, therefor.

In column 1, line 48, delete "RFD" and insert -- RDF --, therefor.

In column 2, lines 16-17, delete "ValueID 1." and insert -- ValueID1. --, therefor.

Signed and Sealed this
Twenty-seventh Day of January, 2015

Michelle K. Lee
*Deputy Director of the United States Patent and Trademark Office*